Patented Nov. 7, 1922.

1,434,619

UNITED STATES PATENT OFFICE.

DANIEL E. McALLISTER, OF PEDRICKTOWN, NEW JERSEY, ASSIGNOR TO E. I. DU PONT DE NEMOURS & COMPANY, OF WILMINGTON, DELAWARE, A CORPORATION OF DELAWARE.

AZO-LAKE COLOR.

No Drawing.   Application filed February 11, 1922.   Serial No. 535,900.

*To all whom it may concern:*

Be it known that I, DANIEL E. McALLISTER, a citizen of the United States, and a resident of Pedricktown, in the county of Salem and State of New Jersey, have invented certain new and useful Azo-Lake Colors, of which the following is a specification.

This invention relates to lakes containing aluminum and barium and the mono-azo dye obtainable by coupling in acid solution diazotized para-nitranilin-ortho-sulfonic acid with 2, 8-aminonaphthol-6-sulfonic acid; and my invention also includes the process of making said lakes.

The azo dye from which the new lakes are derived has the following graphical formula:

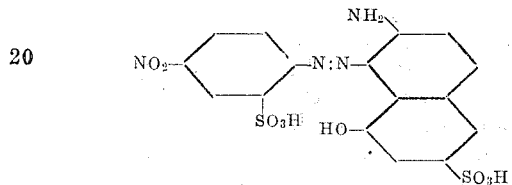

Generally speaking, the lakes may be produced by precipitating the above-described azo dye on a substratum of aluminum hydroxide, the precipitating agent being preferably a barium salt. The ney process may be illustrated by the following examples:—

I. Aluminum hydroxide is first prepared by adding a solution of 50 lbs. of sodium carbonate in 125 gallons of water to a solution of 100 lbs. of aluminum sulfate in 250 gallons of water at 212° F., and washing the resulting $Al(OH)_3$ free from sulfates. 10 lbs. of the mono-azo dye dissolved in 120 gallons of water at 212° F. is then added to the purified aluminum hydroxide, and the dye is precipitated by adding to the mixture, maintained at a temperature of about 140° F., a solution of 40 lbs. of barium chloride in 40 gallons of water. The mixture is stirred for about one hour at a temperature of about 140° F., is then made up to a volume of about 5500 gallons by the addition of water, and the water drawn off; the precipitate is again made up to 5500 gallons, the water drawn off, and the insoluble mass finally filtered and dried.

II. This example is the same as example I, except that the aluminum sulfate solution is treated with a solution containing 40, instead of 50, lbs. of sodium carbonate. The lake made according to this example is bluer in shade than the one made according to example I.

The new lakes are fairly fast to acids, alkalies, and water. The reactions of these lakes when brought into contact with various liquids may be indicated as follows:—

With sulfuric acid—brown solution with base insoluble.

With water—reddish brown, then bluish red solution.

With alcohol—insoluble.

With ether—insoluble.

With benzine—insoluble.

Upon reduction the new lakes in general become redder, the changes occurring upon reduction with various reducing agents being indicated as follows:—

| Reducing agent. | Color change. |
|---|---|
| Zinc and ammonium hydroxide. | Colorless, oxidizes in air to dull red. |
| Stannous chloride and hydrochloric acid. | Light reddish blue, oxidizes to pale violet. |
| Zinc and hydrochloric acid. | Colorless, oxidizes in air to yellow. |
| Hydrosulphite. | Colorless, oxidizes in air to pale yellow. |

The properties of the lakes with respect to fastness may be shown by the following table:

*Fastness test (to bleeding).*

| Solvents. | Formula A. | Formula B. |
|---|---|---|
| Alcohol | Insoluble. | Insoluble. |
| Benzol | Insoluble. | Insoluble. |
| Benzine | Insoluble. | Insoluble. |
| Oil (linseed) | Insoluble. | Insoluble. |
| Turpentine | Insoluble. | Insoluble. |
| Water | Insoluble. | Insoluble. |
| Acid (20% mineral) | Good. | Good. |
| Alkali (20% NaOH) | Good. | Good. |

Although my invention has been described in great detail in the above examples it will

I claim:—

1. A lake comprising a mono-azo compound whose molecule includes the following atomic grouping:

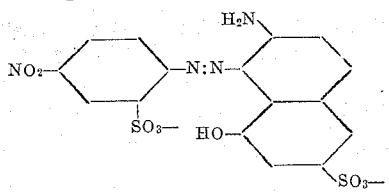

associated with an aluminum compound.

2. A lake comprising a barium salt of a mono-azo dye whose molecule includes the following atomic grouping:

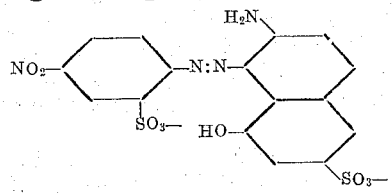

associated with an aluminum compound.

3. A lake comprising a mono-azo compound whose molecule includes the following atomic grouping:

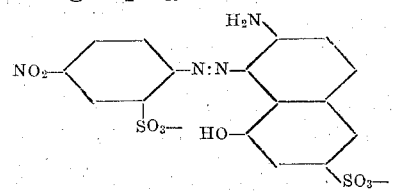

associated with aluminum hydroxide, said lake giving upon reduction (1) with stannous chloride and hydrochloric acid, a light reddish blue solution which oxidizes to a pale violet, and (2) with zinc and hydrochloric acid, a colorless solution which oxidizes to yellow.

4. A lake obtainable by precipitating in the presence of aluminum hydroxide, with barium chloride, a mono-azo compound whose molecule includes the following atomic grouping:

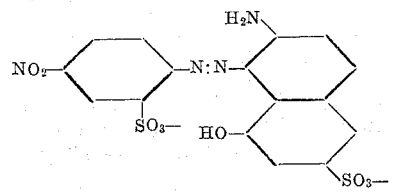

said lake giving in sulfuric acid a brown solution and an insoluble residue, and yielding upon reduction with stannous chloride and hydrochloric acid a light reddish blue solution which, when oxidized, becomes pale violet.

5. The process of making a lake color which comprises precipitating from its water solution, by means of a solution of a barium salt, in the presence of aluminum hydroxide, a mono-azo compound whose molecule includes the following atomic grouping:

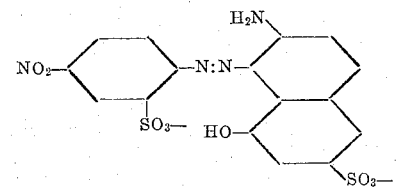

6. The process of making a lake color which comprises adding to 100 parts of aluminum sulfate in water solution an alkaline-reacting sodium compound equivalent in amount to from about 40 to 50 parts of sodium carbonate, washing free from sulfates the resulting precipitate of aluminum hydroxide, adding to the latter a solution containing 10 parts of the hereinbefore described mono-azo dye, precipitating a mono-azo compound by adding a solution containing about 40 parts of barium chloride, stirring the resulting mixture while maintaining it at a temperature between 90 and 190° F. until the formation of the lake is completed, and then washing, filtering and drying the resulting lake.

In testimony whereof I affix my signature.

DANIEL E. McALLISTER.

Certificate of Correction.

It is hereby certified that in Letters Patent No. 1,434,619, granted November 7, 1922, upon the application of Daniel E. McAllister, of Pedricktown, New Jersey, for an improvement in "Azo-Lake Colors," errors appear in the printed specification requiring correction as follows: Page 1, line 30, for the misspelled word "ney" read *new*, and line 69, for the word "benzine" read *benzene;* and that the said Letters Patent should be read with these corrections therein that the same may conform to the record of the case in the Patent Office.

Signed and sealed this 5th day of December, A. D., 1922.

[SEAL.]
KARL FENNING,
*Acting Commissioner of Patents.*